UNITED STATES PATENT OFFICE.

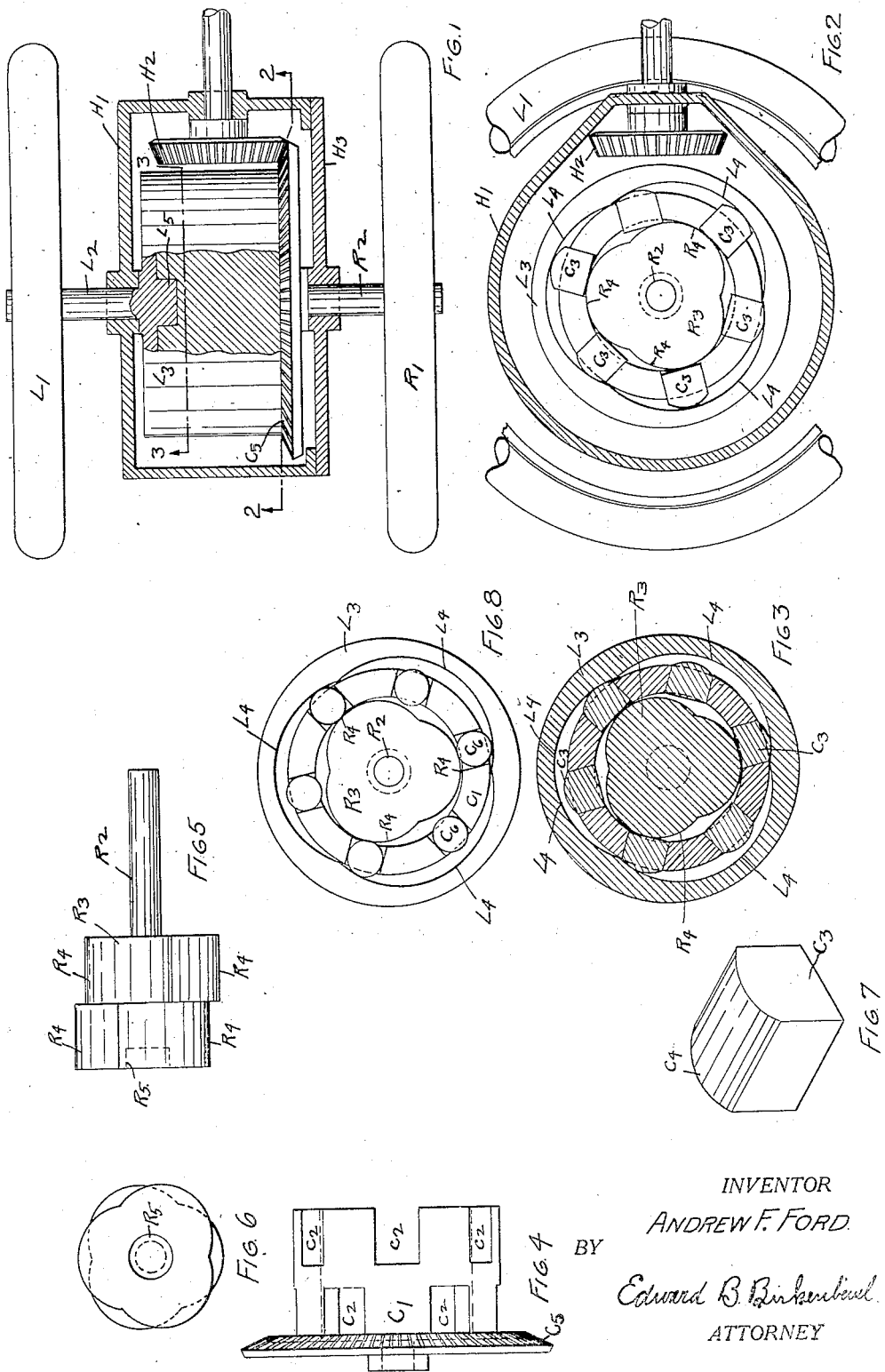

ANDREW F. FORD, OF PORTLAND, OREGON.

GEARLESS DIFFERENTIAL.

1,336,950.  Specification of Letters Patent.  Patented Apr. 13, 1920.

Application filed September 8, 1919. Serial No. 322,336.

*To all whom it may concern:*

Be it hereby known that I, ANDREW F. FORD, a citizen of the United States, residing in Portland, in the county of Multnomah and State of Oregon, have invented a new and useful Gearless Differential, of which the following is a specification.

My invention refers more particularly to a device for differentiating between drive wheels of an automobile.

The object of my invention is to provide a differential without the use of the usual gears and to prevent the spinning of either wheel from any reason whatsoever.

I accomplish these results in the manner set forth in the following specification and illustrated in the accompanying drawing, in which:

Figure 1 is a plan of the device with the housing and parts of the differential broken away to expose the parts; Fig. 2 is a section along the line 2—2 in Fig. 1 showing the differentiating members of one section of the device in a racing position; Fig. 3 is a section along the line 3—3 in Fig. 1 and shows the corresponding parts to those shown in Fig. 2 in a driving position; Fig. 4 is a detailed elevation of a cage for the differentiating members and its drive gear; Fig. 5 is a detailed elevation of a double three faced cam member of which Fig. 6 is a front elevation; Fig. 7 is an enlarged perspective of the wedging members; Fig. 8 is a view similar to Fig. 3 except that I show rollers used as wedging members instead of parts shaped similar to the one shown in Fig. 7.

Similar letters and numbers of reference refer to the same or similar parts throughout the several views.

Referring in detail to the drawing. $L^1$ is the left rear wheel of an automobile of which $L^2$ is its live shaft and $L^3$ a differential case secured to the shaft $L^2$. $L^4$ is the tri-centric interior of the differential case $L^3$ which is constructed of three equal arcs whose radii are somewhat smaller than those of the smallest diameter of the differential casing $L^3$. $L^5$ is a hub formed inside of the differential case $L^3$ in prolongation of the shaft $L^2$.

$R^1$ is the right rear wheel mounted on the live shaft $R^2$, on the inner end of which is secured the double three lobed cam $R^3$ whose lobes $R^4$ are equal arcs struck from the same centers as are the arcs which form the inside of the differential casing $L^3$. The recess $R^5$ in the cam $R^3$ is adapted to receive the hub $L^5$ and center the cam $R^3$.

$H^1$ is a housing adapted to journal the shaft $L^2$ and carry the bevel drive pinion $H^2$. $H^3$ is a cover plate for the side of the housing $H^1$ which journals the shaft $R^2$.

$C^1$ is a differential cage arranged to rotate between the cam member and the differential case $L^3$ and having the slots $C^2$ which are adapted to contain the wedge blocks $C^3$, the outer sides of which are curved at $C^4$. $C^5$ is a bevel gear attached to the cage $C^1$. $C^6$ is a roller form of wedge blocks which I have illustrated as a modification of my device in Fig. 8.

The operation of my device is as follows. In driving in a straight line it is evident that both of the wheels $L^1$ and $R^1$ will rotate at the same speed and they receive their rotation from the pinion $H^2$ which drives the gear $C^5$ to which is attached the cage $C^1$ and its wedge blocks $C^3$. It follows that the wedge blocks $C^3$ can race around the axis of the differential only when the members $R^3$ and $L^3$ are in the position shown in Fig. 2, but that it is impossible for the wedge blocks $C^3$ in both sets to race at the same time, inasmuch as they are offset from each other and one set will always be in the position shown in Fig. 3, which is a driving position, inasmuch as the wedge blocks $C^3$ cannot pass the narrow opening between the projection on the surface $L^4$ and the cam lobes $R^4$. If, for any reason, the relative position of the cam lobe $R^4$ and the projection on the surface $L^4$ as shown in Fig. 3 is changed to that occupied by the similar parts in Fig. 2, it follows that the wedge blocks $C^3$ may pass and the wheels allowed to differentiate.

One of the most vital points of advantage in my device is the absolute impossibility of spinning on the part of either wheel due to the fact that the power which is being supplied is utilized by both of the wheels instead of one, as is common in differentials now in use.

In Fig. 8 I have illustrated my device with the use of balls or rollers which will differentiate equally as well as the form shown in Fig. 7, but this form does not possess the gripping qualities of the wedge blocks $C^3$, whose shape permits them to roll into position, giving a tremendous friction power.

I have illustrated and described my device with the three lobed cam and a three sided differential casing, but it is plain that this number and shape may be varied without departing from the spirit of my invention; in fact it is possible to reverse the order and have the depressions in what is now the cam member and the lobes in the differential cylinder. In Fig. 3 I have exaggerated the position of the wedge members for the sake of illustration, but in actual construction the driving position on either of the cams $R^3$ would find the cam lobe $R^4$ and the high point on the surface $L^4$ nearly midway between the pairs of wedge blocks $C^3$. The difference shown on the drawing would result in back lash, which would be undesirable in practice, and as a matter of fact back lash is one of the undesirable points entirely eliminated in my device.

While I have thus described and illustrated my device it is not my intention to limit myself to this precise form or method of application, but intend that it shall cover all forms and modifications that fall fairly within the appended claims.

What I claim as new and desire to protect by Letters Patent of the United States, is:

1. A gearless differential consisting of a cylindrical member attached to one live axle of an automobile, a cam member mounted within said cylinder and secured to the second live axle, a plurality of wedges adapted to occupy space between said cylinder and said cam member, a means for actuating said wedges consisting of a cage having recesses adapted to contain the various wedges, and a means for rotating said cage.

2. A gearless differential consisting of a cylindrical member attached to one live axle of an automobile, said member having its internal surface formed by three arcs struck from three equi-distant points, a double three lobed cam member attached to the other live axle and having the lobes on one cam set midway between those of the other cam, the lobes of each cam having a form which with the cylindrical member can form a path of uniform width around said cylinder, a plurality of wedge members having approximately the shape of a cube, one side of which is curved, arranged equi-distantly around said path, a cage adapted to hold said wedge members in their relative positions, and a means for rotating said wedge around the center axis consisting of a bevel gear attached to said cage and driven directly from the drive shaft.

3. In a gearless differential, the combination of a cylinder mounted on a live axle of an automobile, said cylinder having its internal surface formed by three equal arcs, a double three lobed cam rotatably mounted within said cylinder and centered therein, the lobes of one cam having a position midway between those of the other cam, both cams being rigidly secured to the second live axle in a manner that in three different positions of each cam member a path is formed between said cam and said cylinder, two sets of wedge members arranged equi-distantly around said path, said wedge members having one curved side and their remaining sides are at right angles to each other, a cage member adapted to hold said wedge members of each set in their relative position as well as to hold the individual members of both sets midway between each other, a bevel gear secured to said cage and adapted to rotate same, a bevel pinion meshing with said gear, and a housing adapted to contain the various parts and maintain their relation.

ANDREW F. FORD.